W. H. WAGNER.
MACHINE FOR FUMIGATING OR DISINFECTING BOOKS OR THE LIKE.
APPLICATION FILED APR. 12, 1917.
1,248,211.
Patented Nov. 27, 1917.
3 SHEETS—SHEET 1.
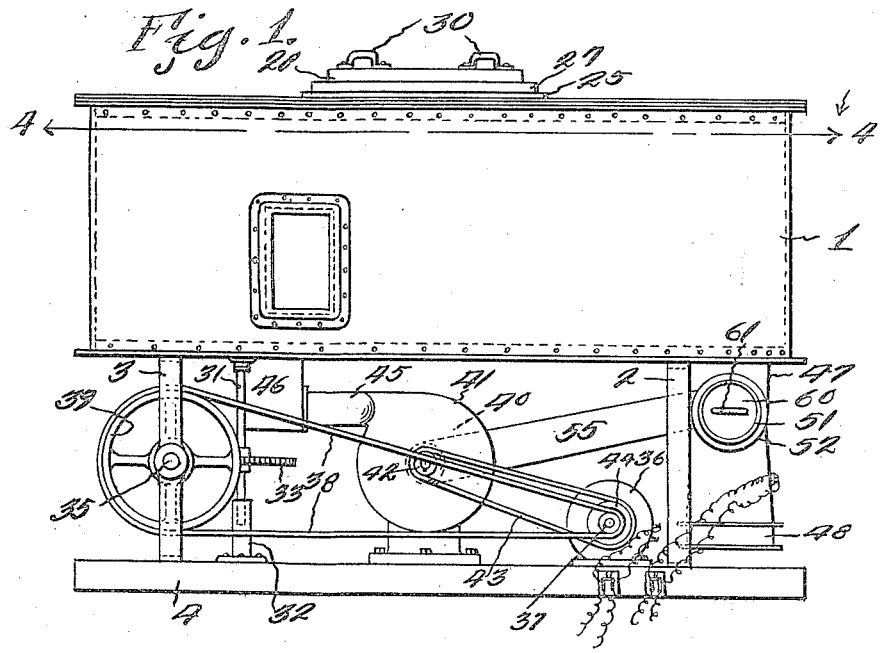
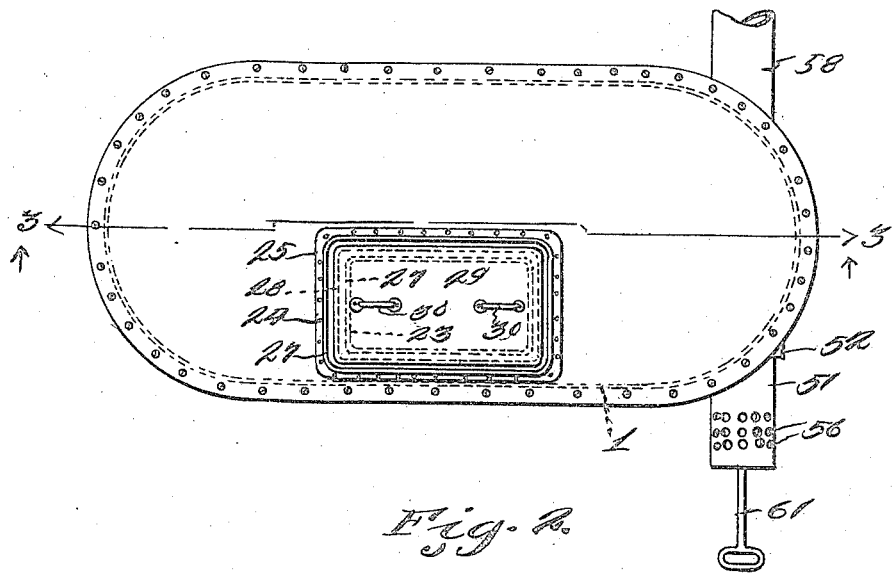
Inventor
W. H. Wagner
Witnesses
By
Attorneys W. H. WAGNER.
MACHINE FOR FUMIGATING OR DISINFECTING BOOKS OR THE LIKE.
APPLICATION FILED APR. 12, 1917.

1,248,211.  
Patented Nov. 27, 1917.  
3 SHEETS—SHEET 2.

Witnesses  
Philip Terrell  
Frances G. Oswell

Inventor  
W. H. Wagner  
By D. Swift & Co.  
his Attorneys

W. H. WAGNER.
MACHINE FOR FUMIGATING OR DISINFECTING BOOKS OR THE LIKE.
APPLICATION FILED APR. 12, 1917.
1,248,211.
Patented Nov. 27, 1917.
3 SHEETS—SHEET 3.
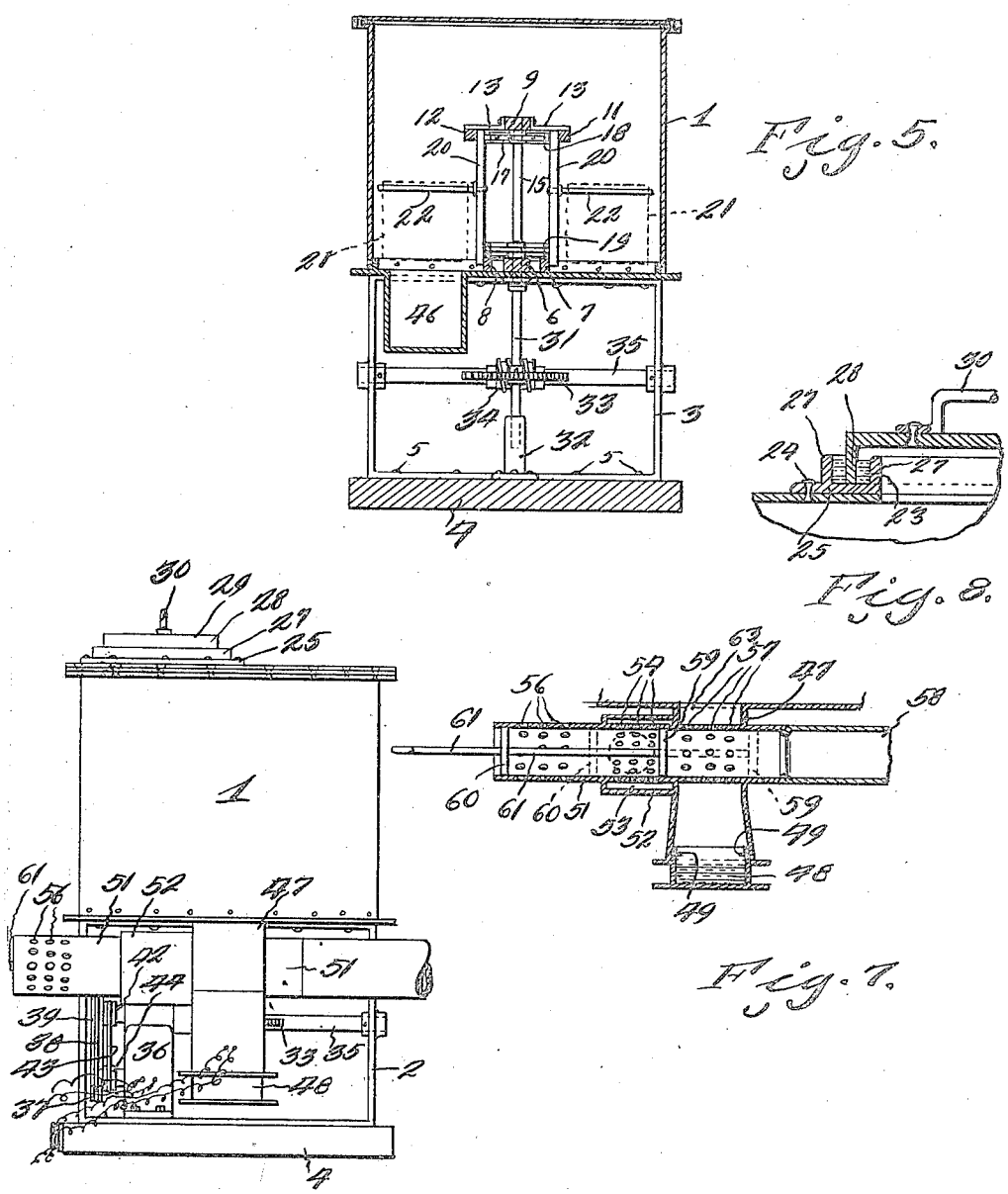

UNITED STATES PATENT OFFICE.

WILLIAM H. WAGNER, OF BURLINGTON, WISCONSIN, ASSIGNOR OF ONE-HALF TO OSWALD RITTMANN, OF BURLINGTON, WISCONSIN.

MACHINE FOR FUMIGATING OR DISINFECTING BOOKS OR THE LIKE.

1,248,211.            Specification of Letters Patent.     Patented Nov. 27, 1917.

Application filed April 12, 1917. Serial No. 161,502.

*To all whom it may concern:*

Be it known that I, WILLIAM H. WAGNER, a citizen of the United States, residing at Burlington, in the county of Racine, State of Wisconsin, have invented a new and useful Machine for Fumigating or Disinfecting Books or the like; and I do hereby declare the following to be a full, clear, and exact description of the invention, such as will enable others skilled in the art to which it appertains to make and use the same.

This invention relates to an improved machine for fumigating and disinfecting books and the like, and an object of the invention is to provide an improved machine of this kind comprising simple and efficient and practical features of construction.

One of the features of construction is the provision of a casing having an endless carrier therein provided with adjustable lateral pins for the suspension of books, so that the carrier may move in one direction, while fumigating means or fumes of some suitable disinfecting material pass in the opposite direction, thereby contacting with the leaves of the books (which are so suspended that the leaves swing open or become separated) thereby disinfecting the same.

Another feature of the invention is to provide a machine, in which the fumes move in an endless course when disinfecting books or the like, there being improved means whereby this course may be intersected and deflected to the exterior atmosphere, thereby blowing the fumes from the casing.

Another feature of the invention is the provision of means for heating the disinfecting material in order to evaporate same, preferably formaldehyde.

Another feature of the invention is the provision of a water sealed closure of the casing.

In practical fields the details of construction may necessitate alterations falling within the scope of what is claimed.

The invention comprises further features and combination of parts as hereinafter set forth, shown in the drawings and claimed.

In the drawings:—

Figure 1 is a view in side elevation of the improved machine constructed in accordance with the invention.

Fig. 2 is a top plan view of the machine.

Fig. 5 is a transverse sectional view on line 5—5 of Fig. 4.

Fig. 6 is an end view.

Fig. 7 is a sectional view through the valve construction for controlling the course of the fumes.

Fig. 8 is a detail sectional view showing the water sealed connections for the closure of the casing.

Referring more especially to the drawings, 1 designates a suitable casing, which is supported upon the rectangular frames 2 and 3, there being one at each end, and which frames in turn are secured upon a base 4 by means of the screw 5. The casing 1 in side elevation and plan view, is elongated, and in plan view it is to be seen that the ends of the casing are rounded. However, the casing may be constructed any other suitable shape or contour.

Figure 3:
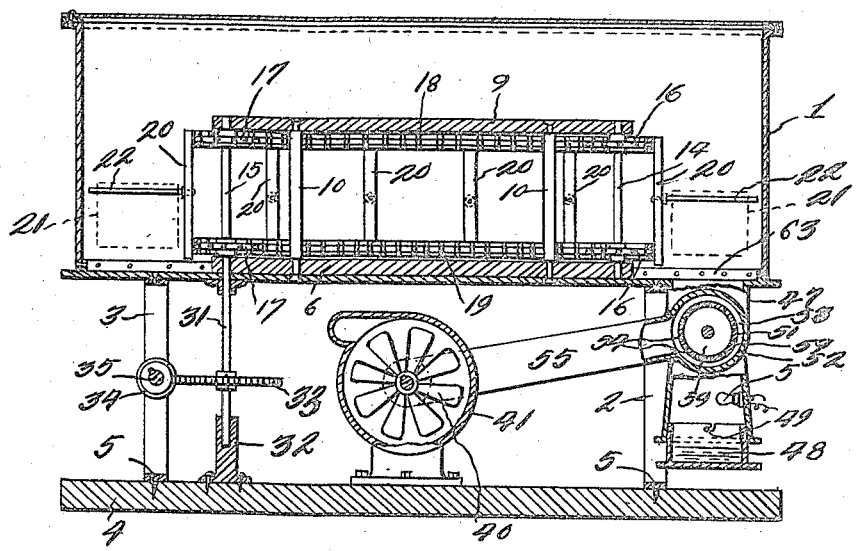
Fig. 3 is a longitudinal sectional view on line 3—3 of Fig. 2.

Arranged on the bottom of the casing 1 is a beam 6, and spaced at intervals upon opposite sides of the beam 6 and parallel therewith are the strips 7 and 8. A beam 9 as shown in Fig. 5 is supported directly above and spaced from the beam 6 by the supporting rods or members 10, better shown in Fig. 3. Supported in parallelism with but a little below the beam 9 and upon its opposite sides, by means of the angular plates 13, are strips 11 and 12. Journaled in bearings of the beams 6 and 9 are the shafts 14 and 15 having sprockets 16 and 17, about which the sprocket chains 18 and 19 engage. Connecting the upper and lower chains 18 and 19 are the bars 20, which, when the chains are moving, so engage the strips 7 and 11, as to guide and support the chains in position, against the weight of the books 21 shown in dotted lines in Fig. 5, which books are suspended upon the adjustable lateral rods or arms 22, which are carried by the bars 20. The casing 1 has an opening 23 in its top wall, through which access may be had, for suspending the book upon the arms 22. Secured to the top of the casing by means of suitable rivets or the like 24, and about the opening 23 is a plate 25, or rather a rectangular ring plate, which corresponds with the shape of the opening.

Figure 4:
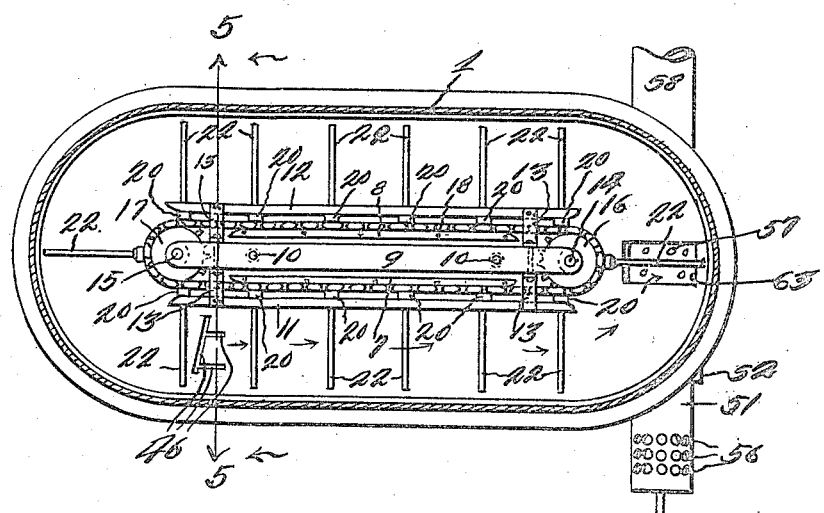
Fig. 4 is a sectional view on line 4—4 of Fig. 1.

However, this plate is provided with a pair of spaced upwardly extending flanges 27, thereby forming a U-shaped portion, to receive water or the like, into which the flange 28 of the closure 29 is received, thereby providing a water sealed connection for the closure, which has a suitable handle 30. The shaft 15 is provided with a downwardly extended part 31 mounted in a suitable bearing 32 on the base 4. A suitable gear 33 is secured on the shaft 31, and is in mesh with the worm 34 of the shaft 35, which is mounted in suitable bearings of the rectangular frame 3. A conventional form of motor 36 (which may receive current supply from any suitable source) is mounted upon the bar 4, and upon the shaft of the motor is a suitable pulley 37 having a belt connection 38 with the pulleys 39, which is also mounted upon the shaft 35 better seen in Fig. 1, for transmitting power to the shaft 35, in order to impart motion to the endless carrier upon the interior of the casing 1. A suitable fan 40 having the casing 41 is provided and one end of the shaft of the fan has a pulley 42, which in turn has a belt connection 43 with a second pulley 44 upon the pulley 37. The casing 41 of the fan has an extension 45 which communicates with the interior of the casing 1 at one end by means of several slots or openings 46, the main slot may be constructed in parallelism with or at an angle with the books while the other slots are at right angles to the books and at the same level as casing bottom shown in Fig. 4. The casing 1 at the other end has its bottom provided with a downwardly protruding extension 47, in the lower end of which a disinfecting material holder or pan 48 is detachably supported by means of slot and pin connections 49. Any suitable disinfecting material may be placed in the pan, such as formaldehyde or the like, there being suitable heating unit such as an electric light bulb or the like 50, designed to receive its current supply from any suitable source, for heating the disinfecting material in order to evaporate same. The extension casing 47 has integral therewith a transverse tubular casing 51, and as shown in Fig. 7, the left hand end of this tubular casing has an annular wall 52 surrounding the casing 51 at a spaced interval therefrom, thereby providing the space or passage 53, and where this space or passage is formed the wall of the tubular casing is provided with a plurality of perforations or apertures 54. Connected integrally to the wall 52, so as to communicate with the space or passage 53 is a tube or conduit or pipe 55, which connects to one side of the fan casing, so as to communicate with the interior of the fan casing. The extreme end portion of the left hand end of the tubular casing is provided with apertures or perforations 56, and that part of the tubular casing 51, which passes transversely of the extension casing 47 is also provided with apertures or perforations 57. A suitable pipe or conduit 58 is connected to the tubular casing 51, so as to carry off the fumes to the exterior atmosphere, when the fumes are being blown from the casing 1. A pair of disk valves 59 and 60 are mounted upon a rod 61, and are designed to be moved in the tubular casing 51, so as to divert the air or the fume from the casing. Before taking out the books after being disinfected or fumigated in the casing 1 the disk valves are positioned as shown in Fig. 7, thereby allowing the fan to draw fresh air through the apertures 56 into the space 53, through the pipe 55, and blow it through the extension 45 into the books in the casing 1, from which it passes through the opening 63 out through the apertures or perforations 57 through the pipe or conduit 58, thereby blowing the fumes along with the fresh air, after the books or the like have been fumigated or disinfected. After such books or other articles are placed in the casing 1, the disk valves are shifted to the position shown in dotted lines, by moving the rod 61, in which case the fan will carry the fumes from the formaldehyde or other disinfecting material in the holder 48 through the apertures 57, and then through the apertures 54 through the conduit 55, and through the extension 45 into the casing, and back through the opening 63, thereby making an endless circuit, which may be diverted or interrupted and blown through the conduit or pipe 58, when it is desired to remove the books or other articles, so that others may be substituted.

The invention having been set forth what is claimed as new and useful is:—

1. A disinfecting or fumigating apparatus comprising a closed casing having an endless carrier designed to move in one direction and carry articles to be fumigated and means for forcing an endless circuit of fumes into the casing for fumigating the articles, and means for interrupting and diverting the endless course of fumes and forcing them into the exterior atmosphere, and a heating unit for heating the disinfecting material said means for forcing the endless circuit of fumes in the casing including a fan and means geared to the fan and the endless carrier for operating them simultaneously.

2. In a disinfecting apparatus, a casing, an endless carrier mounted therein and having means to support articles to be disinfected, said casing having a downwardly depending tubular member provided with means to support disinfectant material, the first tubular member having a transverse tubular member and provided with a passage of communication with one end of the casing, said transverse tubular member having three sets of apertures, means in the transverse tubular member to be actuated manually, whereby the two sets of apertures are put into communication, whereby an endless circuit of the fumes from the disinfectant material may be passed through the first and second tubular members and the passage, and means in said passage to generate said endless circuit.

3. In a disinfecting apparatus, a casing having a tubular member at one end thereof and in communication therewith, an endless carrier in the casing having means to support articles disinfected, said tubular member having means at its lower end to support disinfectant material, a second tubular member extending transversely of the first tubular member, an annular casing surrounding the second tubular member adjacent the first tubular member, a passage of communication between said annular casing and the other end of the first casing, said second casing having perforations of communication with the first tubular member and the annular casing respectively, said second tubular member at one end having apertures, and its other end having an outlet pipe extending to the exterior atmosphere, a pair of disk valves movable simultaneously in the second tubular member to coöperate with the apertures of communication, whereby the first tubular member and the first and second casings may be thrown into communication, means in said passage to generate an endless circuit of fumes from the disinfectant through the passage, the first and second tubular members and said casings, and a manually actuated rod carrying said disk valves for shifting the same, whereby the apertures at one end of the second tubular member are in communication with the apertures communicating with said passage for drawing fresh air into the passage and forcing it into the first casing, and then out through the outlet pipe of the first tubular member.

In testimony whereof I have signed my name to this specification in the presence of two subscribing witnesses.

WILLIAM H. WAGNER.

Witnesses:
GEORGE W. WALLER,
MARIE ARMOUR.

Copies of this patent may be obtained for five cents each, by addressing the "Commissioner of Patents, Washington, D. C."